INVENTOR.
NORRIS N. MURRAY

3,521,627
AUTOMATIC EMERGENCY BREATHING OXYGEN SYSTEM FOR AIRCRAFT
Norris N. Murray, San Bruno, Calif., assignor to H. Koch & Sons, Inc., Corte Madera, Calif., a corporation of California
Filed Jan. 23, 1968, Ser. No. 699,895
Int. Cl. A62b 7/14
U.S. Cl. 128—142                                             4 Claims

ABSTRACT OF THE DISCLOSURE

Emergency oxygen supply cylinders are connected through a pressure reducer, solenoid valve, oxygen personal leads connector, oxygen hoses, oxygen regulator, to the oxygen mask and the hypoxia warning system in the oxygen mask for opening said solenoid valve below a predetermined partial pressure of oxygen in said mask.

BRIEF DESCRIPTION OF THE INVENTION

Oxygen cylinders containing 100% breathing oxygen (max. 2200 p.s.i.g.) are manifolded together and have a capacity to provide approximately 10 to 15 minutes of breathing oxygen for an air crew man. The oxygen pressure is reduced through a pressure reducer. A normally closed two-way solenoid valve actuated automatically when the oxygen supply in the security mask is reduced below a predetermined normal so as to release oxygen into the mask. The automatic release operates through a sensor in the mask capable of detecting the pressure within the oxygen mask and utilizing the result of this detection for automatically opening the electro-magnetic valve.

DESCRIPTION OF FIGURES

FIG. 4 is a wiring diagram of the electrical parts of the system.

DETAILED DESCRIPTION

Figure 1:
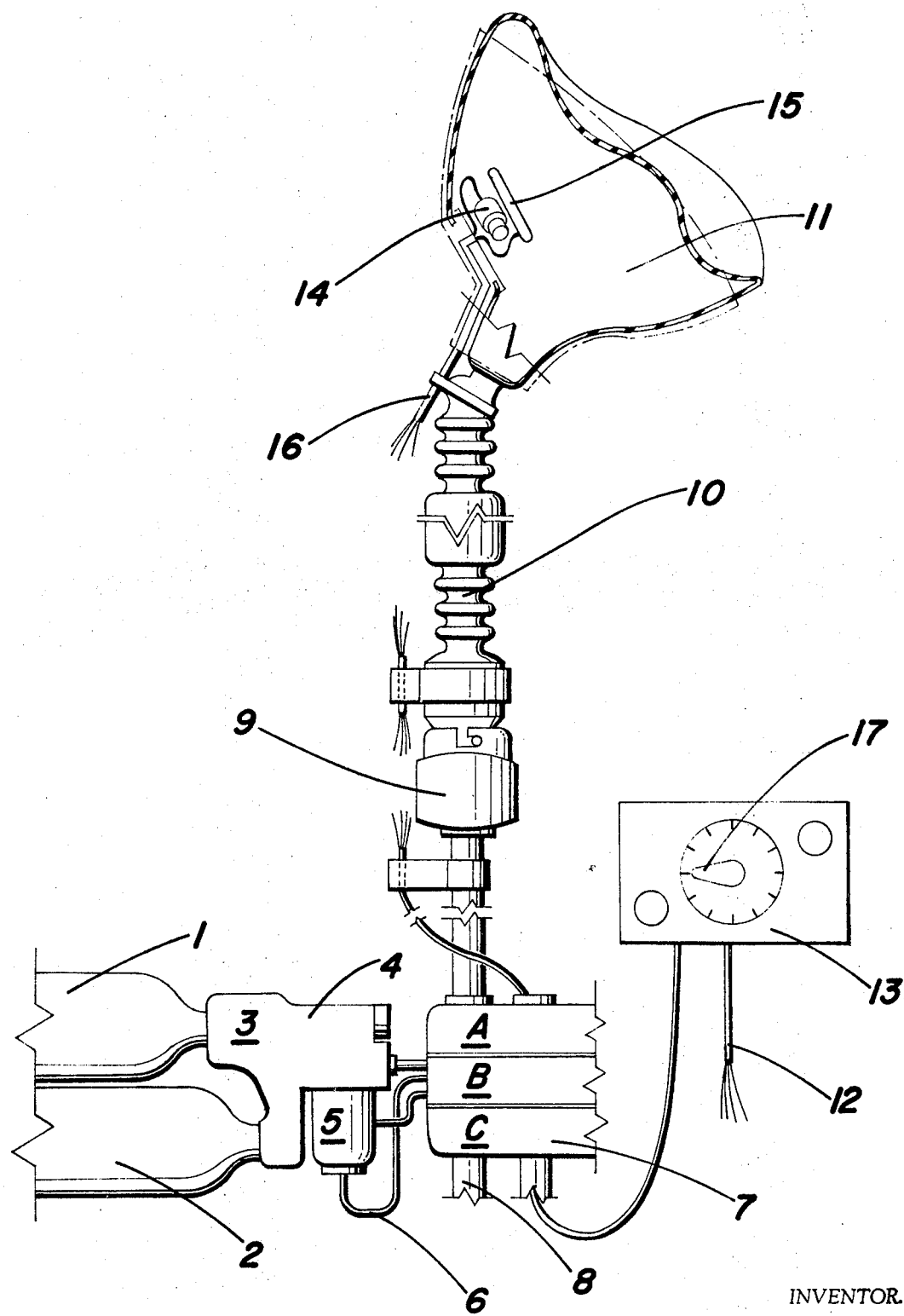
FIG. 1 is a partly sectional side view of the automatic oxygen supply system.

The deficiencies in existing systems of manually operated emergency oxygen supply, caused errors in flying judgment, sometimes with fatal consequences, because many pilots have suffered a condition of hypoxia, which frequently is accompanied with a feeling of elation and well being, depriving the pilot of the presence of mind for manual operation of his emergency oxygen. Pilots are usually too preoccupied with flying the aircraft to always observe the visual or other signals indicating diminishing oxygen supply, and therefore, the pilot is unaware of the lack of oxygen when the main oxygen system becomes depleted.

In the herein illustration, a typical aircraft installation is shown. Emergency oxygen supply cylinders 1 and 2 are manifolded in a common manifold 3. The oxygen cylinders 1 and 2 have a capacity to provide approximately 10 to 15 minutes of breathing oxygen for an air crew man. A pressure reducer 4 reduces the pressure from the pressure in the manifold 3 (max. 2200 p.s.i.g.) to about 70 p.s.i.g. pressure. A normally closed two-way solenoid valve 5 has its intake connected to the outlet of the pressure reducer 4

A mechanical override cable 6 is connected to the valve in such a manner as to open the valve mechanically when a separable personal leads connector 7 becomes disconnected.

Normal main supply oxygen from aircraft mounted cylinders, not shown, are connected by suitable tubing 8 to the separable connector 7.

The separable connector 7 is the type shown in U.S. Pat. No. 3,351,082 granted to J. A. Gaylord on Nov. 7, 1967, wherein various conduits, inclusive the oxygen conduit, feed through three sections, A, B and C of the disconnect device. The central section B of the disconnect device is usually fixed to a survival kit. The lower section C of the disconnect device is fixedly connected to the aircraft. The top part A is releasably connected to the central portion B to permit the air crew man to separate from the connector at will. The portions A and B together are separable from portion C so that when the air crew man is ejected from the aircraft together with his survival kit, communication is established through the solenoid valve 5 and through the middle portion B and through the top portion A of the connector 7 between the emergency oxygen supply and the mask. The top member A of the connector 7 is connected by a suitable conduit to the usual oxygen regulator 9. The oxygen regulator 9 is connected to an end of a convoluted oxygen hose 10 of suitable length, which latter in turn is connected to the oxygen breathing mask 11.

The electrical actuation is accomplished by the following circuit:

Electrical lead lines 12, connected to the source of electrical power in the aircraft, are connected through an amplifier 13 and through the connector 7 to a hypoxia warning sensor 14, located next to the communications microphone 15 in the oxygen mask 11. The electrical leads 16 connect the sensor 14 through the connector 7 to the amplifier 13.

The sensor 14, in this illustration, is a so-called polarographic oxygen sensor (Beckman Model 7841 lv) which consists of a silver anode and a gold cathode enclosed within a single plastic housing. A cellulose base gel, held in place by a Teflon membrane serves as the electrolytic agent. The Teflon membrane is permeable by oxygen, and thus the oxygen diffuses to the cathode, where a reaction takes place. A potential of 0.8 volt is applied across the two electrodes and this results in a current flow which is directly proportional to the partial pressure of oxygen to which the sensor 14 is exposed in the mask 11. Thus the sensor 14 reduces an output current as long as the electrolyte is exposed to an atmosphere containing oxygen. This load is passed through the amplifier 13, developing a voltage which is amplified and used to drive a display meter 17, and also to operate a relay for energizing the solenoid for opening the valve 5 for an emergency supply of oxygen.

A minimum partial pressure of oxygen required to prevent hypoxia is approximately 90 mm. Hg. The voltage amplified through the amplifier 13 closes a relay in the amplifier 13 whenever the partial pressure of oxygen ($pO_2$) declines to 90 mm. The formula for determining $pO_2$ is exemplified as follows:

Oxygen comprises 20.92% of atmospheric air at sea level (760 mm. Hg). Therefore:

$$pO_2 = \frac{20.92}{100} \times 760 = 159.14 \text{ mm. Hg}$$

When the $pO_2$ declines from 159.14 mm. Hg (sea level) to 90 mm. Hg (approximately equivalent $pO_2$ existing at 15,000 ft. altitude) hypoxia occurs in the human being.

When the sensor 14 detects that $pO_2$ is reduced to the minimum of 90 mm. Hg in the oxygen mask 11, it produces the output current which drives the indicator hand 17 on the visual warning panel amplifier 13 to a position registering with the graduation for 90 mm. Hg, at the same time the output current closes a relay switch in the amplifier 13 to close the electric current flow to the solenoid in the solenoid valve 5.

The solenoid valve 5 thus opens and as hereinafter described is locked in open position allowing oxygen to escape from the manifold 3 through the pressure reducer 4 and then through the connector 7 and the oxygen regulator 9 and through the oxygen hose 10 into the breathing mask 11. This fresh supply of oxygen is sensed by the sensor 14 which will cause the electric current change to turn the amplifier visual display 13 so as to indicate the increase of $pO_2$ back to a safe condition.

The pilot at times of certain emergencies is required to eject from the aircraft. The connector 7 automatically separates from the lower connector part C, while the parts A and B are ejected with the pilot. This separation is described in the aforementioned Gaylord patent. Such separation of the connector 7 from the connector part C cuts off both the normal oxygen supply and the electrical current of the aircraft, but the pilot needs emergency oxygen immediately and automatically. This is accomplished mechanically by the cable 6 which is connected to the disconnect device of Gaylord Pat. No. 3,351,082, which will pull the cable 6 to mechanically open the solenoid valve 5 in the manner hereinafter described.

Figure 2:
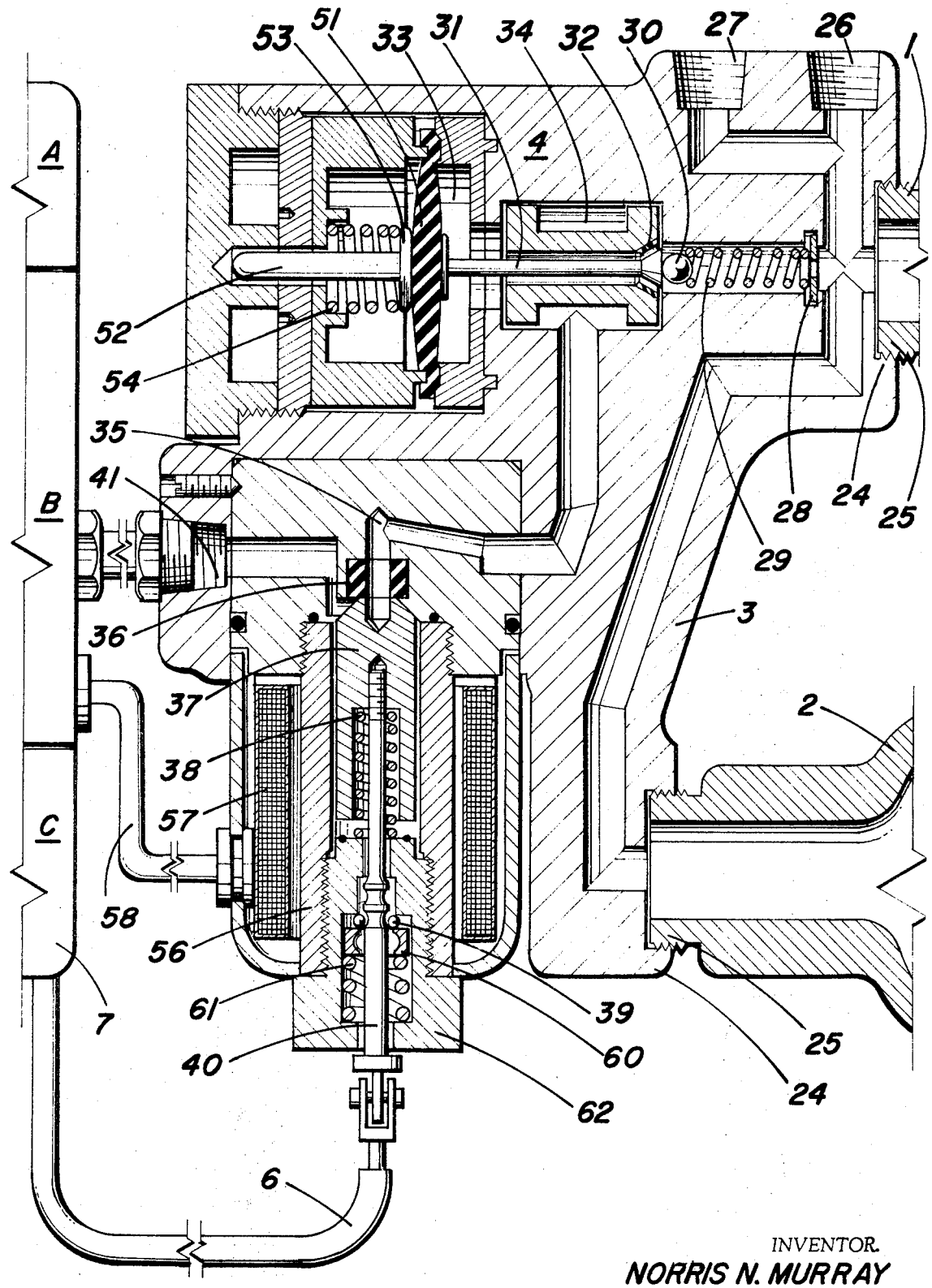
FIG. 2 is a fragmental view showing in section the electro-magnetic valve in closed position.
Figure 3:
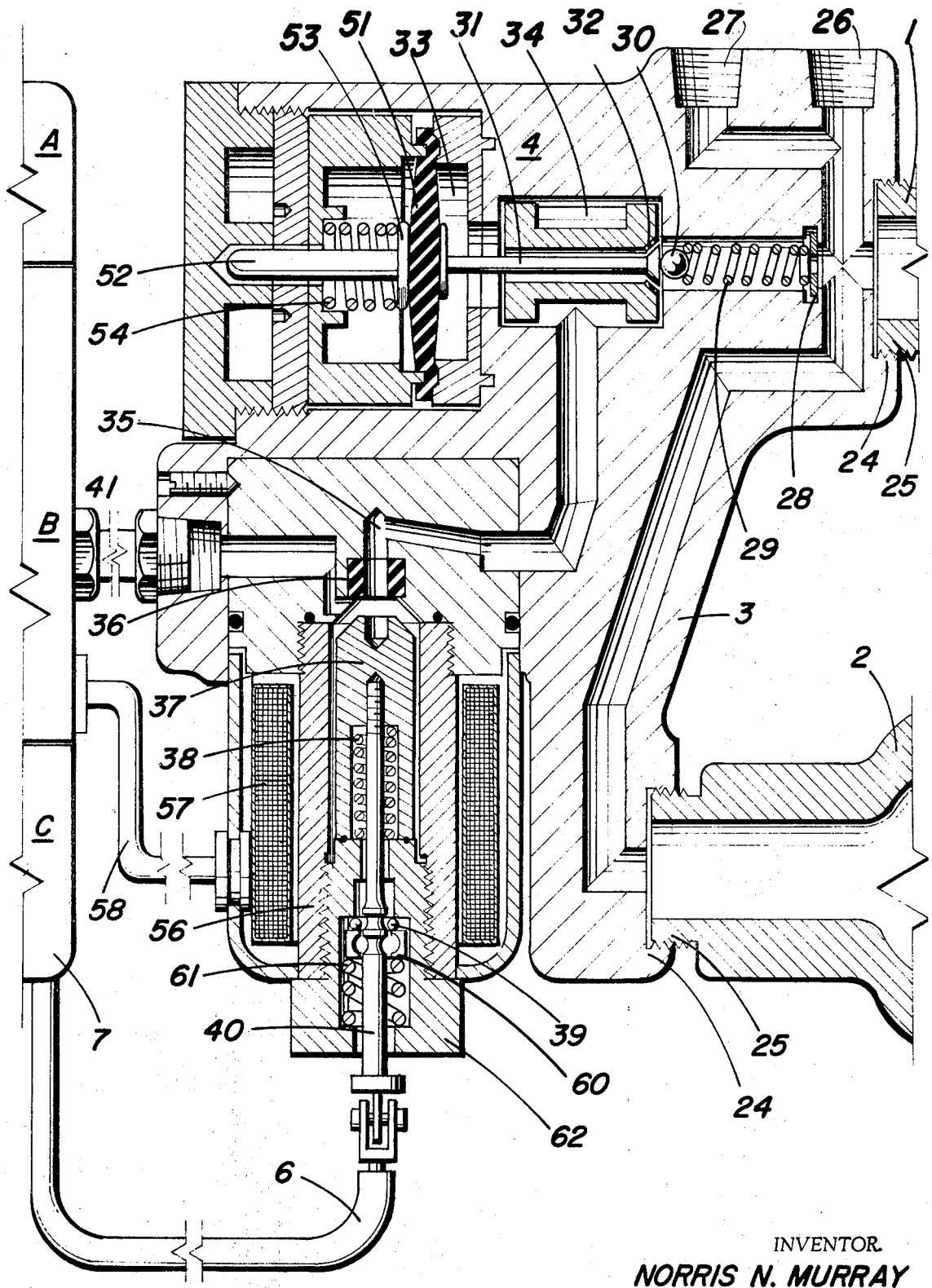
Figure 4:
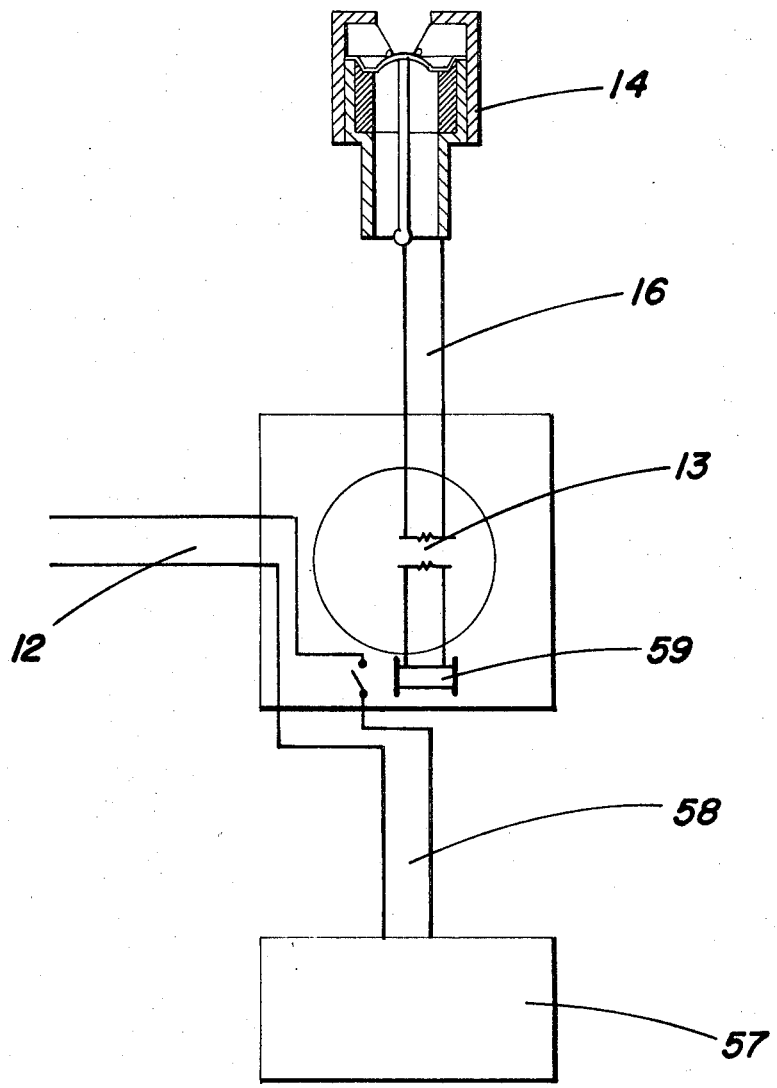
FIG. 4 is a fragmental view showing in cross-section the electro-magnetic valve open.

The solenoid actuated valve unit and manifold, as illustrated in FIG. 2, includes the following elements:

The manifold 3 has on it threaded inlet ports 24 into which the threaded mouths 25 of the cylinders 1 and 2 are screwed. The manifold 3 also has a filler port 26 normally plugged but adapted to receive a usual filler valve for refilling the cylinders 1 and 2. Adjacent the filler port 26 is a threaded hole 27, normally plugged, in which a pressure gauge may be mounted.

The pressure reducer 4 includes a perforated spring retainer 28 against which bears one end of a coil spring 29 which spring at its other end bears against a valve ball 30, which latter in turn bears against a pin valve 31 normally spaced from a valve seat 32 and communicates with a diaphragm chamber 33 and with chamber 34 around the pin valve, leading to a passage 35 at a valve seal 36. A valve armature 37 is normally seated in valve-closing position on the valve seal 36 by a coil spring 38 and is locked by a ball detent 39 acting in recessed portions of an armature pin 40 extended through the coil spring 38 and threaded into the armature 37. When the valve armature 37 is seated on the valve seal 36 the air is prevented from passing to an outlet port 41 of the valve.

Across the diaphragm chamber 33 is fixed an elastomer diaphragm 51 which bears against the pin valve 31 on the one side. A follower pin 52 bears against the other side of the diaphragm 51. The follower pin 52 has a head 53 which bears against the diaphragm 51 and is pressed by a coil spring 54. Thus compression spring force is exerted from both sides of the diaphragm 51 by springs 29 and 54 respectively. The fluctuation of the diaphragm and the spring loads imposed by the springs 29 and 54 control the outlet pressure variation, which is adjusted to render a constant outlet pressure of 70 p.s.i. The fluctuation of the diaphragm 51 controls the spring-loaded valve ball 29 and the pin valve 31. Movement of the pin valve 31 governs the flow of oxygen past its tapered head, namely between its tapered head and its valve seat 32, through which the oxygen passes to the diaphragm chamber 33, the valve chamber 34 and through the valve seal 36, and when the valve is open to the valve outlet 41. Thus the fluctuation of the diaphragm determines the amount of oxygen flow and the pressure drop which remains constant at the outlet side of the pressure reducer assembly.

The valve armature 37 is within a tube 56, which is surrounded by a solenoid 57. An electric conduit 58 extended through the connector 7 to a relay switch 59 in the amplifier 13 and is connected to the solenoid 57 for energizing the solenoid whenever the relay switch 59 is actuated. When the solenoid 57 is energized, then the armature overcomes the action of the coil spring 38 and moves away from the valve seal 36. The ball detents 39 are held in place by a detent collar 60 which is pressed against the ball detent 39 by a coil spring 61. This detent assembly is held in a plug 62 screwed into the tube 56. The armature pin 40 extends through the detent collar 60 and spring 61 and through the plug 62. The outside end of the armature pin 40 is suitably connected to the pull line cable 6 so as to be mechanically pulled when the connector 7 is separated in the manner described in said Gaylord Pat. No. 3,351,082.

I claim:

1. In an automatic emergency breathing oxygen system for aircraft, the combination with a breathing mask, of
    (a) a conduit for conducting oxygen to the breathing mask,
    (b) means to normally conduct oxygen to said conduit from the oxygen supply of the aircraft,
    (c) an emergency supply of oxygen,
    (d) means to conduct the emergency supply of oxygen to said conduit,
    (e) a yieldably closed electro-magnetically actuated valve interconnected in said conducting means between said emergency oxygen supply and said conduit,
    (f) a sensor in said breathing mask for operating said electromagnetic valve below a predetermined partial pressure of oxygen in said mask, thereby to release oxygen from said emergency oxygen supply to said conduit,
    (g) said means to conduct normal supply of oxygen from the oxygen supply of the aircraft including a separable connector,
    (h) and means connected to said separable connector for mechanically opening said valve when said connector is separated,
    (i) means ot hold said valve in open position after each actuation.

2. The invention defined in claim 1 and said sensor being capable of producing an electric current at said predetermined partial pressure of oxygen, and
    (j) an electrical amplifying and indicator device connected into the electric circuit between said sensor and said electro-magnetic valve, to amplify said current for actuating said electro-magnetic valve.

3. The invention defined in claim 1 and
    (j) said separable connector being between said conduit and the normal oxygen supply,
    (k) one part of said separable connector being connectable to the aircraft and the other part being removable with said conduit,
    (l) a pulling element connected to said valve for opening the valve,
    (m) said means to hold valve in open position after each actuation holding said pulling element in valve opening position after the valve is opened,
    (n) a pulling member connected to said pulling element and to said connector whereby said pulling element is pulled for opening the valve whenever said separable connector is separated.

4. The invention defined in claim 3 and
(o) an amplifier and indicator device interconnected between source of electricity and said sensor and being connected to said electromagnetic valve for converting the electric current generated by said sensor into a current energizing said electro-magnetic valve for opening the valve.

References Cited

UNITED STATES PATENTS

| 2,824,557 | 2/1958 | Mejean | 128—142.3 |
| 3,160,577 | 12/1964 | Nolan | 204—195 |
| 3,215,057 | 11/1965 | Turek | 98—1.5 |

RICHARD A. GAUDET, Primary Examiner

J. B. MITCHELL, Assistant Examiner